United States Patent
Shaffer et al.

(10) Patent No.: US 7,065,785 B1
(45) Date of Patent: Jun. 20, 2006

(54) APPARATUS AND METHOD FOR TOL CLIENT BOUNDARY PROTECTION

(75) Inventors: Shmuel Shaffer, Palo Alto, CA (US); William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/333,806

(22) Filed: Jun. 15, 1999

(51) Int. Cl.
*G06F 21/04* (2006.01)

(52) U.S. Cl. ............................. 726/17; 726/3; 726/28; 380/211; 709/225; 709/229; 715/741; 715/742; 715/743; 715/747

(58) Field of Classification Search .............. 713/200, 713/201, 202; 340/5.74; 709/225, 229; 345/741, 711; 380/211; 726/3, 17, 28; 715/741, 715/742, 743, 747
See application file for complete search history.

(56) References Cited

U.S. PATENT DOCUMENTS

| 5,495,566 | A |   | 2/1996  | Kwatinetz ................... 395/157 |
| 5,533,110 | A | * | 7/1996  | Pinard et al. .......... 379/355.01 |
| 5,548,702 | A |   | 8/1996  | Li et al. ...................... 395/155 |
| 5,550,968 | A |   | 8/1996  | Miller et al. ................ 395/157 |
| 5,621,401 | A |   | 4/1997  | Jeon et al. ..................... 341/22 |
| 5,642,185 | A |   | 6/1997  | Altrieth, III et al. |
| 5,699,104 | A |   | 12/1997 | Yoshinobu |
| 5,740,389 | A |   | 4/1998  | Li et al. ...................... 395/346 |
| 5,819,284 | A |   | 10/1998 | Farber et al. ............... 707/104 |
| 5,852,436 | A |   | 12/1998 | Franklin et al. ............ 345/326 |
| 6,574,661 | B1| * | 6/2003  | Delano et al. .............. 709/223 |

FOREIGN PATENT DOCUMENTS

| EP | 0 829 995 A2 | 3/1998 |
| EP | 0 952 511 A2 | 10/1999 |
| JP | 07129268 | 5/1995 |
| WO | WO 96/26477 | 8/1996 |

OTHER PUBLICATIONS

IBM Technical Disclosure Bulletin (IBM TDB) Mar. 1985, vol. 27, Issue No. 10B, p. 6126.*
U.S. Appl. No. 09/162,351, filed Sep. 28, 1998, Shaffer et al.

* cited by examiner

*Primary Examiner*—Emmanuel L. Moise
*Assistant Examiner*—Paul Callahan

(57) ABSTRACT

A telephony-over-LAN (ToL) system having a graphical user interface (GUI) wherein an authorized or guest user may be locked within a ToL window, having full access to the ToL features, but denied access to other parts of the computer system. In such a system, the terminal user or subscriber may click on a "Guest" button on the ToL client GUI screen before leaving the computer. The ToL guest user may then execute the call normally. According to a first embodiment of the invention, the ToL client locks the user into the ToL client screen. Keystrokes and mouse cursor movements which would allow exiting the ToL client are prevented. According to a second embodiment, of the invention, the ToL client screen is "maximized" and the minimize or resize window functions are blocked. When the terminal subscriber returns, a password is entered to regain full access to the computer.

22 Claims, 5 Drawing Sheets

APPARATUS AND METHOD FOR TOL CLIENT BOUNDARY PROTECTION

BACKGROUND OF THE INVENTION

Telephony-over-local area network (ToL) systems allow computers on local area networks (LANs) or packet networks to function as telephony clients. While such systems are advantageous in that a separate telephone need not be provided, the integration of the telephone with the computer means that a user of a telephony application can have access to the entire computer network.

While the use of a screen saver is known to prohibit unauthorized access to a computer without inputting an appropriate password, it is undesirable to have a conventional screen saver functioning during a ToL telephone conversation. For example, activation of a screen saver during such a conversation can cause the ongoing communication to fail, or can limit access to some features. As such, use of a screen saver is not an adequate solution to computer security during a ToL conversation.

Further, while systems are known which will "lock" a user into a particular window of a graphical user interface (GUI) during a particular process, such systems do not "unlock" the window until the function is completed. Thus, there is no way for a user to both execute the process and carry on another procedure using another program.

SUMMARY OF THE INVENTION

A telephony-over-LAN (ToL) system is provided having a graphical user interface (GUI) wherein an authorized or guest user may be locked within a ToL window, having full access to the ToL features, but denied access to other parts of the computer system. In such a system, the terminal user or subscriber may click on a "Guest" button on the ToL client GUI screen before leaving the computer. The ToL guest user may then execute the call normally. According to a first embodiment of the invention, the ToL client locks the user into the ToL client screen. Keystrokes and mouse cursor movements which would allow exiting the ToL client are prevented. According to a second embodiment, of the invention, the ToL client screen is "maximized" and the minimize or resize window functions are blocked. When the terminal subscriber returns, a password is entered to regain full access to the computer.

Broadly speaking, according to the present invention, a ToL controller is provided which monitors cursor and keyboard inputs, and prevents any commands from being executed which would allow an unauthorized user to exit the ToL client application or its associated window. The ToL controller is further configured to accept password authorization, to release the window or exit lock.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
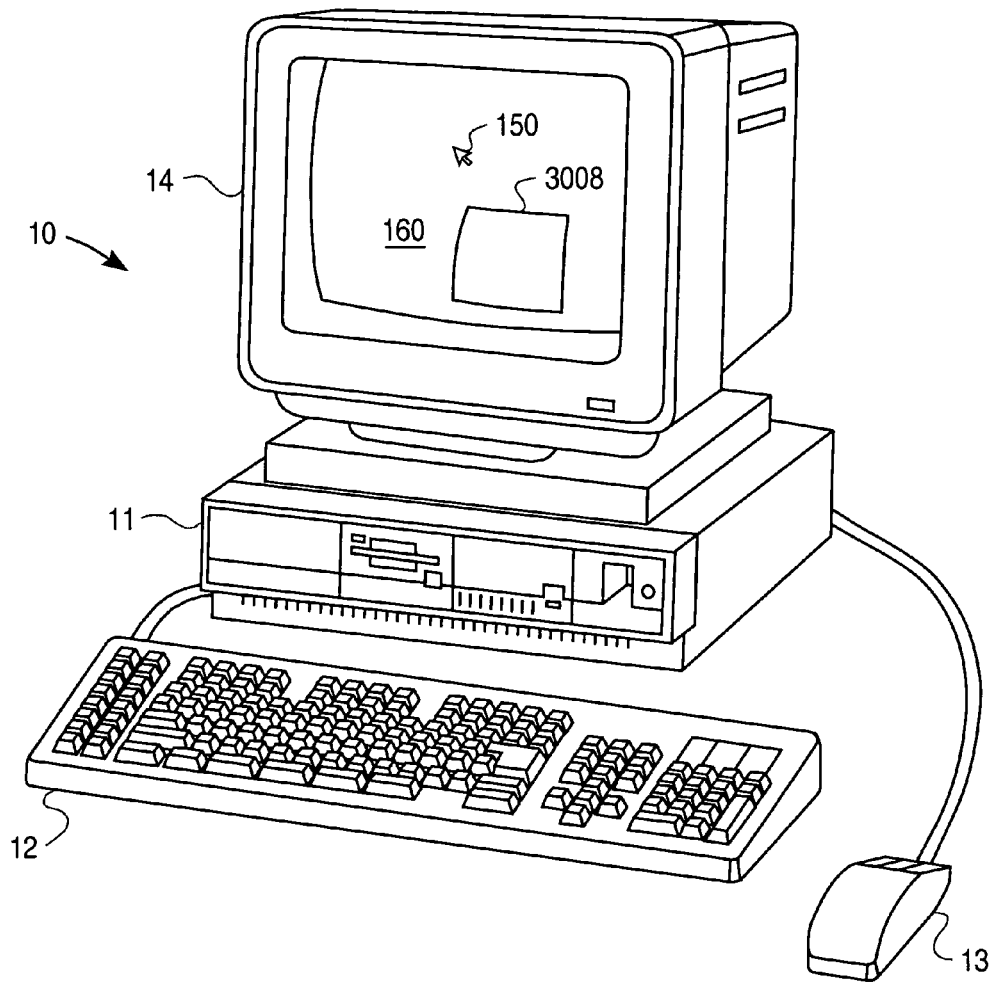
FIG. 1 illustrates an exemplary computer system according to an embodiment of the invention.

Turning now to the drawings and, with particular attention to FIG. 1, an exemplary computer 10, including a system unit 11, a keyboard 12, a mouse 13, and a display 14 are depicted. The computer 10 may include ToL client terminal functionality according to the present invention. The screen 160 of the display device 14 is used to present the graphical user interface (GUI) and particularly, the ToL client window 3008. The graphical user interface supported by the operating system allows the user to employ a point-and-click method of input, i.e., by moving the mouse pointer or cursor 150 to an icon representing a data object at a particular location on the screen 160 and pressing one or more of the mouse buttons to perform a user command or selection. As will be explained in greater detail below, the computer 10 is configured to prevent an unauthorized user from accessing commands or selections which would access portions of the computer system external to the ToL client window or functions.

Figure 2:
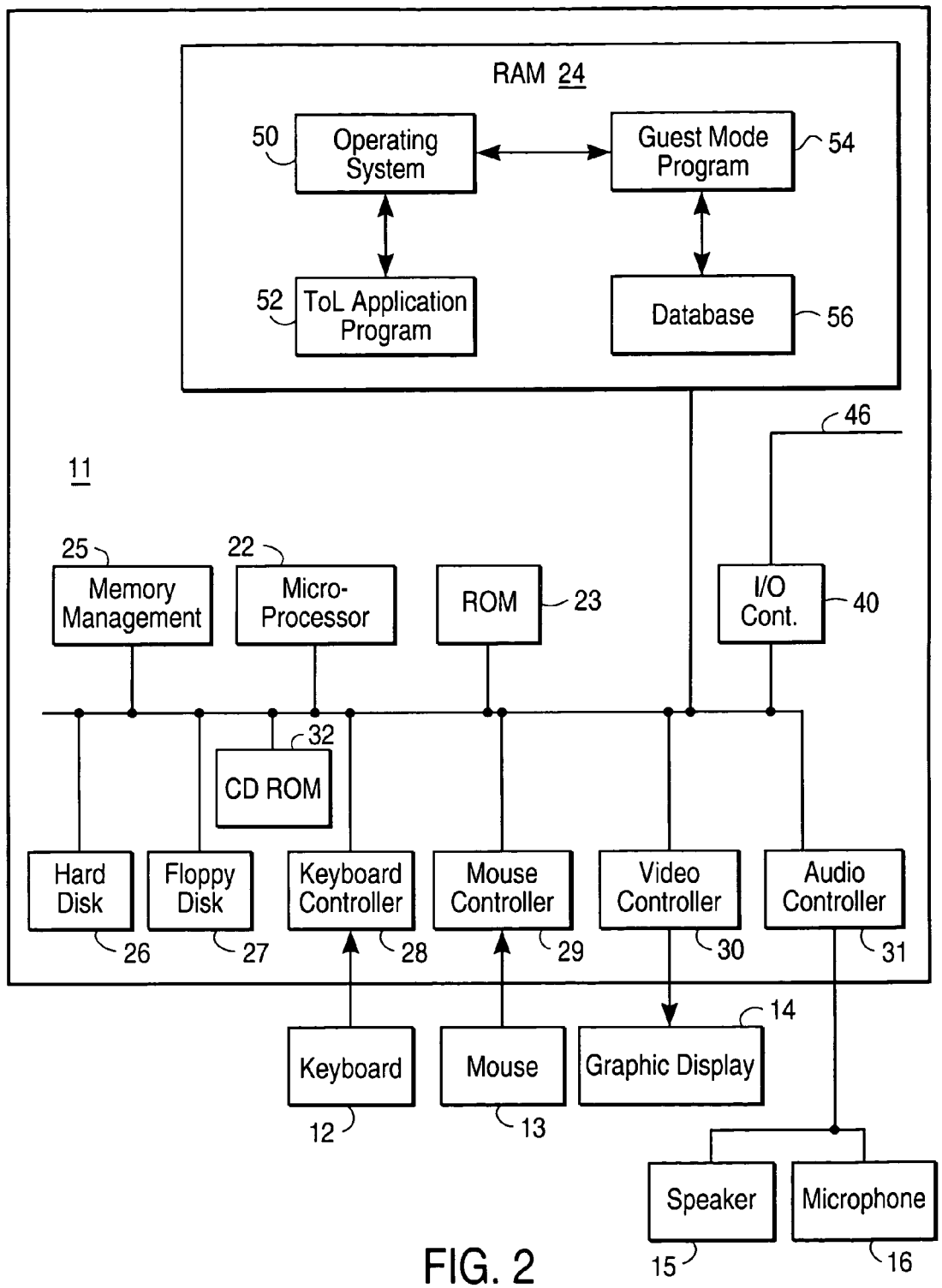
FIG. 2 is a block diagram of the computer system of FIG. 1.

FIG. 2 shows a block diagram of the components of the personal computer shown in FIG. 1. The system unit 11 includes a system bus or a plurality of system buses 21 to which various components are coupled and by which communication between the various components is accomplished. The microprocessor 22 is coupled to the system bus 21 and is supported by the read only memory (ROM) 23 and the random access memory (RAM) 24 also connected to the system bus 21. The microprocessor 22 may be embodied as any of a variety of microprocessors, including the Intel x86, Pentium or Pentium compatible processors.

The ROM 23 contains among other code the basic input output system (BIOS) which controls basic hardware operations such as the interaction of the disk drives and the keyboard. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. The CD ROM drive 32, is also coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard 12; the mouse controller 29 provides the hardware interface for the mouse 13; the video controller 30 is the hardware interface for the video display 14; and the audio controller 31 is the hardware interface for the speakers 15 and microphone 16. The speaker 15 and the microphone 16 allow for audio communication during ToL operation.

An I/O controller 40 enables communication over a network 46, such as a packet network. More particularly, the I/O controller 40 may be an H.323 Recommendation interface, to allow for telephony or multimedia communications via the packet switched network.

One embodiment of the present invention is provided as a set of instructions in a code module resident in the RAM 24. Until required by the computer system, the set of instructions may be stored in another computer memory, such as the hard disk 26, on an optical disk for use in the CD ROM drive 32, or a floppy disk for use in the floppy disk drive 27. As shown in the figure, the operating system 50, the ToL client application 52, the guest mode controller 54, and the password database 56 are resident in the RAM 24.

As will be discussed in greater detail below, the operating system 50 functions to generate a graphical user interface on the display 14. The ToL application program 52 performs ToL functionality, including generation of a ToL client window in the GUI. The guest mode program 54, which may be embodied as a component of the ToL client application 52, functions to cause entry into and exit from a guest mode, as will be discussed in greater detail below. Finally, the database 56 stores a list of authorized users and their passwords.

Figure 3A:
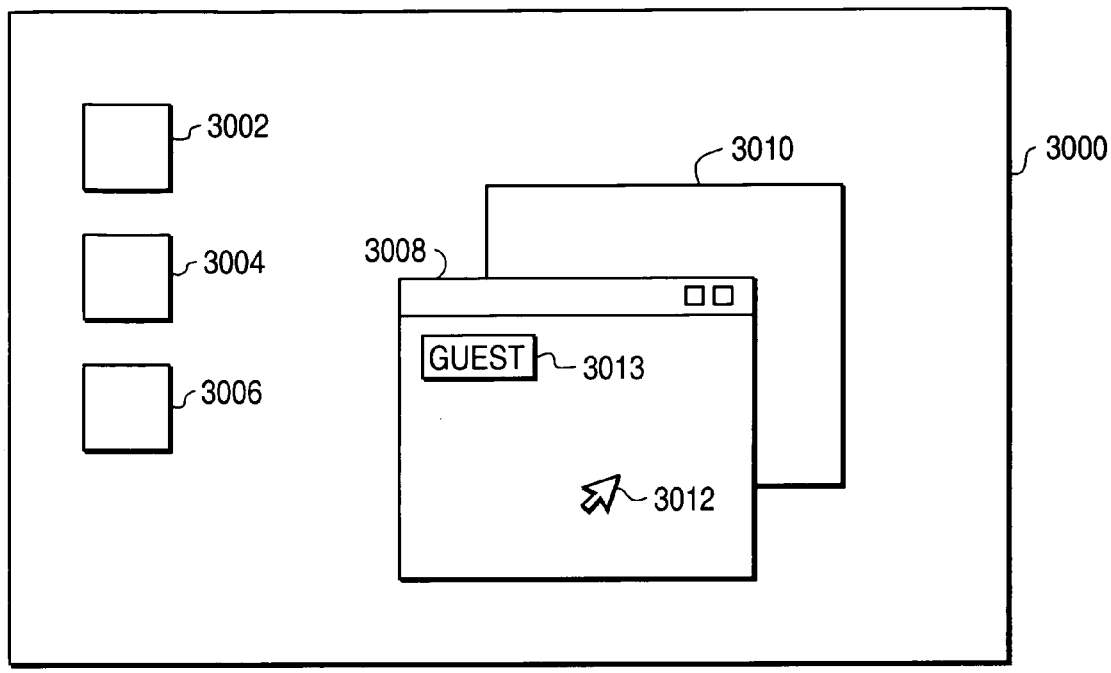
FIG. 3A and FIG. 3B illustrate exemplary graphical user interface(s) according to an embodiment of the invention.

Turning now to FIG. 3A, a diagram of an exemplary graphical user interface (GUI) according to an embodiment of the invention is illustrated.

The graphical user interface 3000 is representative, for example, of the Windows 95, Windows 98, Windows NT, or similar graphical user interfaces, available from Microsoft Corp. Other graphical user interfaces may be employed, however. As is known, the GUI program is part of the operating system 50 executed by the microprocessor 22. The microprocessor 22 sends signals to the video controller 30, which displays the GUI 3000 on the graphic display 14.

As shown, the GUI 3000 includes a ToL client window 3008. A location of the ToL client window 3008 relative to other portions of the GUI 3000 and other items on the screen are maintained in a known manner. In particular, the system (i.e., the microprocessor 22) is always aware of the locations of boundaries of the ToL client window 3008.

The ToL client window 3008 includes thereon a cursor 3012. Movement of the cursor 3012 is accomplished via manipulations of the mouse 13, which sends signals to the mouse controller 29 and/or the microprocessor 22 in a known manner. The video controller 30 then processes signals received from the microprocessor 22 to display the cursor on the graphic display 14. An exemplary ToL client window 3008 is the GUI for the Siemens HiNet™ RC 3000 system, available from Siemens.

The GUI 3000 further includes one or more second windows 3010, which are representative of, for example, other applications programs, such as word processors or spreadsheets. Further, one or more icons 3002, 3004, 3006, representative of other applications programs may be available.

Also included in the ToL client window 3008 is a Guest icon 3013 according to the present invention. Clicking on the guest icon 3013 will cause entry into a guest mode according to the present invention, wherein a guest user is locked or prevented from accessing portions of the computer system, such as the one or more other windows 3010, or the one or more program icons 3002, 3004, 3006, other than the ToL client window 3008.

More particularly, manipulations of the mouse 13, in conjunction with location information regarding the cursor 3012 are received as signals by the mouse controller 29 and analyzed by the microprocessor 22. As is known, manipulations of the mouse are translated into a coordinate system of the cursor 3012 relative to the ToL client window 3008 and the GUI 3000, generally. According to the present invention, the movements of the cursor 3012 external to the ToL client window 3008 are disallowed, and the cursor 3012 is prevented from exiting the ToL client window 3008.

In addition, the microprocessor 22 monitors signals received from the keyboard controller 28. The keyboard controller 28 sends signals to the microprocessor 22 indicative of manipulations, i.e., keystrokes, on the keyboard 12. Such keystrokes may include manipulations of letters, numbers, or function keys, or combinations thereof. In guest mode, the microprocessor 22 disallows any commands which would allow exit from the ToL client window 3008 and therefore access to other portions of the computer system.

It is noted that, alternatively to or in conjunction with the features described above, entry into the guest mode may cause the microprocessor 22 to issue one or more commands to the video controller 30 to "blank" the screen external to the ToL client window 3008. Thus, for example, the icons 3002, 3004, 3006 and the window 3010 may be blended into the wallpaper or otherwise concealed from view.

Figure 3B:
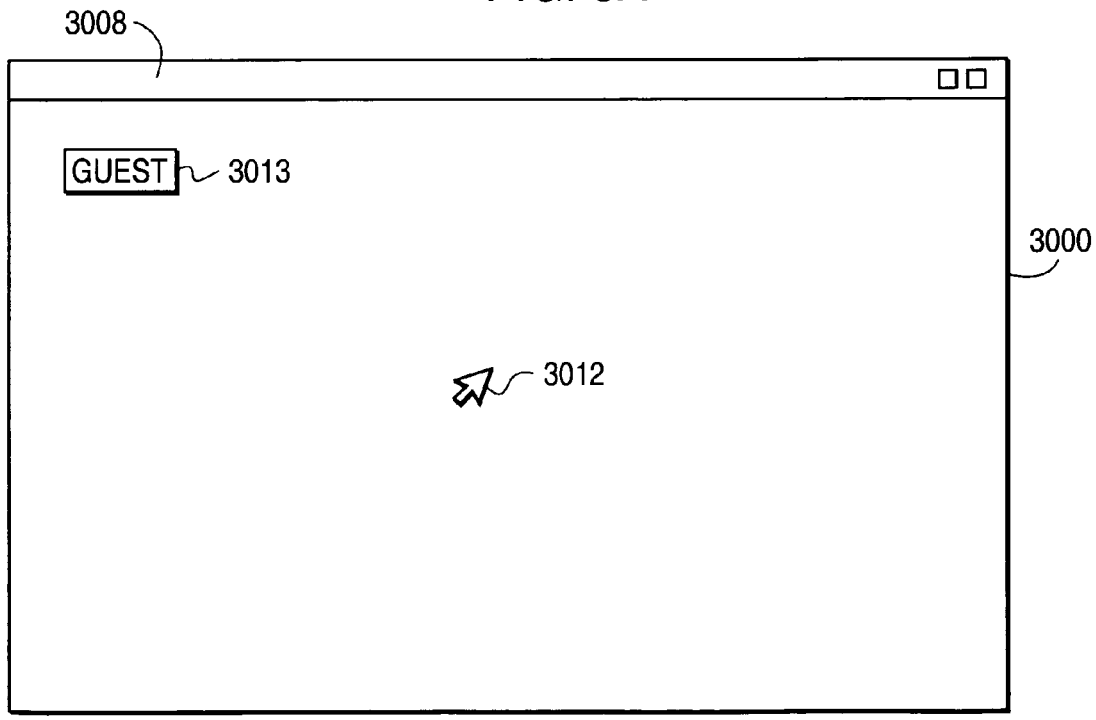

FIG. 3B illustrates a variant on the above-described embodiment. In particular, the ToL client window 3008 is shown in an expanded or maximized state, wherein the ToL client window 3008 is maximized to fill the entire GUI screen 3000. As is known, this may be accomplished through clicking on a Maximize button. If the ToL client window 3008 is already in the maximized state when the Guest button 3013 is clicked, the guest user will be prevented from minimizing or otherwise altering the size of the ToL client window 3008. Thus, the guest user will be prevented from even seeing other portions of the screen of the GUI 3000. Also, as in the above embodiment, keystrokes on the keyboard 12 are prevented from allowing the guest user to exit the ToL client window 3008.

Figure 4:
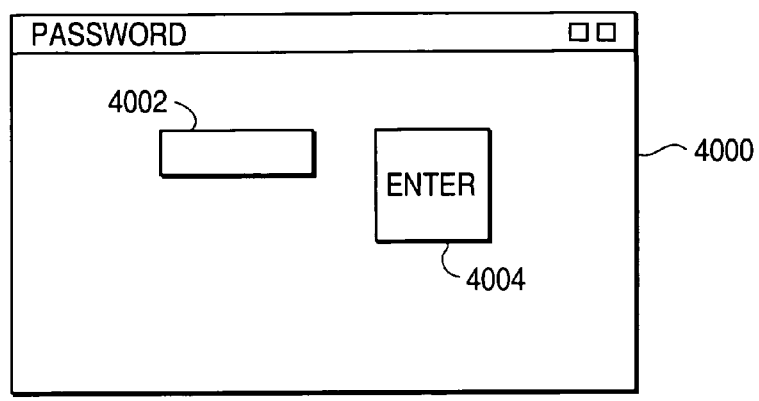
FIG. 4 is a diagram of an exemplary graphical user interface according to another embodiment of the invention.

Once the guest user has finished his telephone call, the ToL client subscriber may click on the Guest button 3013 again (or another button which provides the same functionality). In response, the microprocessor 22 accesses the guest mode program 54 and sends a command to the video controller 30 to display the password window 4000 (FIG. 4). The password window 4000 includes a password entry field 4002 and an Enter button 4004. The ToL client subscriber may type the password into the password entry field 4002 and click the Enter button 4004. The microprocessor 22 reads the password and accesses the database 56 to determine whether the entered password is the same as a stored password. If so, the guest mode is released and the ToL client user may access other portions of the computer system. It is noted that the password may be the user's network log in password, or may be a separate password independently set. Further, the microprocessor 22 may be programmed to prevent the release from guest mode if a predetermined number of incorrect password entries have occurred.

Figure 5:
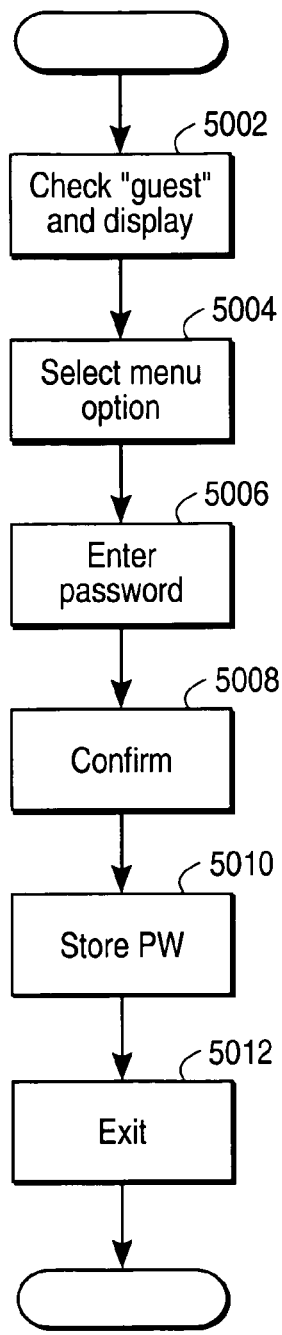
FIG. 5 is a flowchart illustrating operation of an aspect of an embodiment the invention.

Turning now to FIG. 5, a flowchart illustrating password setting according to an embodiment of the invention is shown. In particular, in a step 5002, the ToL client user clicks the guest button or otherwise accesses a guest mode preferences screen (not shown). For example, a manipulation of the mouse 13, such as double clicking, is interpreted by the microprocessor 22 as a command to access such a screen. In a step 5004, the user may select a password entry mode, for example, by clicking an appropriate menu choice or icon. The microprocessor 22 receives a corresponding signal from the mouse controller 29 and generates a password entry screen, which may be similar to the password screen 4000 (FIG. 4). In a step 5006, the ToL client user enters a user selected password into a password entry screen and clicks or otherwise causes the microprocessor to read the entered password. In a step 5008, the ToL client user may be presented with the password entry screen again, to confirm proper entry of the password. Once the password entry has been confirmed (i.e., the previously entered password compared with the confirmation password), the password is stored by the microprocessor in the database 56 on the hard disk. Finally, in a step 5012, the ToL client user may exit from the password entry mode.

Figure 6:
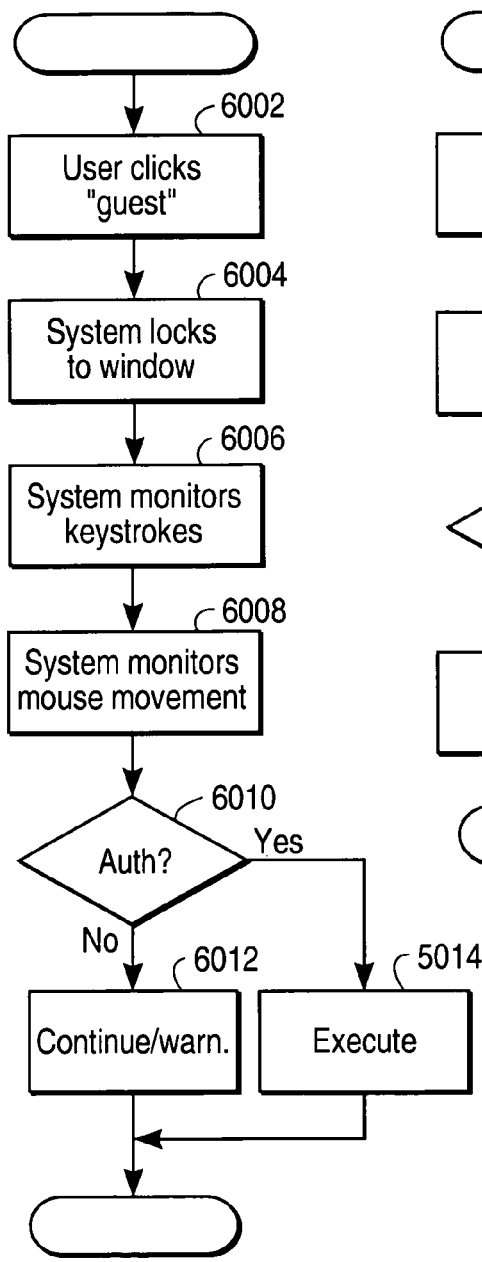
FIG. 6 is a flowchart illustrating operation of an aspect of an embodiment the invention.

Operation of the guest mode is shown in greater detail with reference to FIG. 6. In particular, in a step 6002, the ToL client user may click on the guest button, if a guest user has need to use the ToL telephone. As discussed above, this causes the microprocessor 22, responsive to the ToL application program 52 and the guest mode program 54, to enter into a guest mode wherein the guest user is prevented from accessing other portions of the computer system. Thus, in a step 6004, the microprocessor "locks" the guest user into the ToL client window, which may include blanking other portions of the GUI screen or maximizing the ToL client window. In steps 6006 and 6008, the microprocessor monitors keyboard keystrokes and mouse movements. Thus, the microprocessor 22 monitors the inputs from the mouse controller 29 and the keyboard controller 28 for any which would be unauthorized. For example, the microprocessor 22 may compare the movements of the cursor 3012 with the coordinates of the ToL client window. If a manipulation of the cursor would result in its leaving the ToL client window, it is prevented. Thus, in a step 6010, the microprocessor determines, for each entry or signal received from the keyboard controller 28 and the mouse controller 29, whether a command is authorized. Authorized commands are those which relate to movements of the mouse or cursor within the ToL client window or which pertain to ToL client functionality. If a command is authorized, the system proceeds with and executes it, in a step 6014. If, however, the command is unauthorized, no action will be undertaken, other than, perhaps, to display a warning message, in a step 6012.

Figure 7:
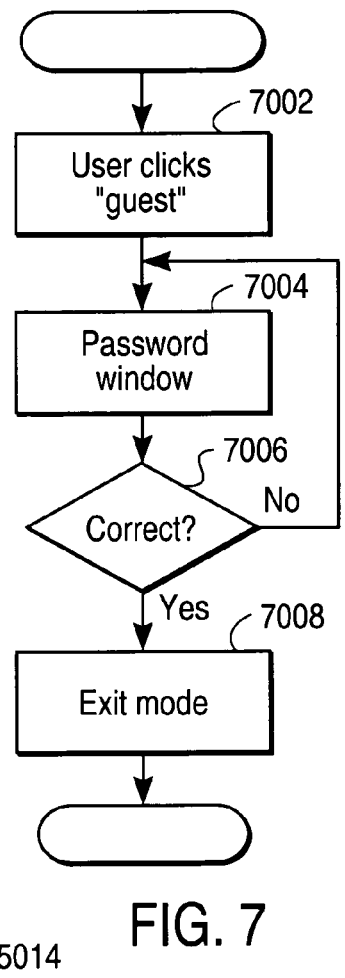
FIG. 7 is a flowchart illustrating operation of an aspect of an embodiment the invention.

Once the guest user has finished his call, the ToL client user may cause the system to exit the guest mode, as shown in the flowchart of FIG. 7. In a step 7002, the ToL client user clicks on the guest button 3013. This causes the microprocessor 22 to cause the display of the password window 4000 (FIG. 4), in a step 7004. The ToL client user then types in the password and the microprocessor determines whether the entered password is correct, in a step 7006. For example, the microprocessor 22 may access a database in the disk drive and compare the stored password with the entered password. If the password is correct, then in a step 7008, the microprocessor releases the system from the guest mode and allows access to the entire computer system. However, if the password is determined not to be correct, then the guest mode is not released. In such a case, a limit on the number of password entry tries may be provided. Further, it is noted that the subscriber may release the guest mode according to the method of FIG. 7 while a call is ongoing.

What is claimed is:

1. A method for operating a Telephony over LAN (ToL) system, comprising:
    providing a graphical user interface (GUI) in a computer;
    providing a ToL client window within said GUI;
    manually placing said ToL client window into a guest mode; and
    locking a guest user into said ToL client window by preventing unauthorized use of functions of said computer external to said ToL client window in said guest mode, while allowing full access to features within said ToL client window.

2. A method according to claim 1, said preventing including monitoring a location of a pointing device cursor and preventing said pointing device cursor from being moved to a location external to said ToL client window.

3. A method according to claim 1, said preventing including monitoring a manipulation of a cursor and preventing said cursor from allowing selection of a function which would cause an exit from said ToL client window.

4. A method according to claim 1, said preventing including monitoring inputs from a keyboard and preventing processing of inputs which would result in an exit from said ToL client window.

5. A method according to claim 1, said preventing including setting a password to determine whether a user is authorized to access said other functions.

6. A method according to claim 1, said preventing including maximizing said ToL client window and preventing an unauthorized user from de-maximizing said ToL client window.

7. A Telephony over LAN (ToL) system, comprising:
    means for providing a graphical user interface (GUI) in a computer;
    means operably coupled to said GUI providing means for providing a ToL client window within said GUI;
    means for manually placing said ToL client window into a guest mode; and
    means for locking a guest user into said ToL client window by preventing unauthorized use of functions of said computer external to said ToL client window in said guest mode, while allowing unrestricted access to features within said ToL client window.

8. A system according to claim 7, including means for monitoring a location of a pointing device cursor and preventing said pointing device cursor from being moved to a location external to said ToL client window.

9. A system according to claim 7, including means for monitoring a manipulation of a cursor and preventing said cursor from allowing selection of a function which would cause an exit from said ToL client window.

10. A system according to claim 7, including means for monitoring inputs from a keyboard and preventing processing of inputs which would result in an exit from said ToL client window.

11. A system according to claim 7, including means for setting a password to determine whether a user is authorized to access said other functions.

12. A system according to claim 7, including means for maximizing said ToL client window and preventing an unauthorized user from de-maximizing said ToL client window.

13. A Telephony over LAN (ToL) client terminal, comprising:
    a microprocessor programmed to provide a ToL client window in a graphical user interface of said ToL client terminal;
    a mouse controller operably coupled to said microprocessor and configured to receive signals from a cursor pointing device; and
    a keyboard controller operably coupled to said microprocessor and configured to receive signals from a keyboard; wherein said microprocessor is programmed to monitor signals from said mouse controller and said keyboard controller and allow a user to manually place said ToL client window into a guest mode and lock a guest user into said ToL client window by allowing unrestricted performance of functions related to ToL operations within said ToL client window and not allow performance of other functions of said computer not related to ToL operations external said ToL client window.

14. A ToL client terminal according to claim 13, where said microprocessor is programmed to prevent a cursor from being positioned external to said ToL client window.

15. A ToL client terminal according to claim 13, where said microprocessor is programmed to maximize said ToL client window and prevent an unauthorized user from de-maximizing said ToL client window.

16. A ToL client terminal according to claim 13, wherein said microprocessor is programmed to monitor a manipulation of a cursor and prevent said cursor from allowing selection of a function which would cause an exit from said ToL client window.

17. A ToL client terminal according to claim 13, wherein said microprocessor is programmed to prevent processing of inputs from said keyboard which would result in an exit from said ToL client window.

18. A ToL client terminal according to claim 13, wherein said microprocessor is programmed to set a password to determine whether a user is authorized to access said other functions.

19. A system in accordance with claim 7, further comprising means for releasing said preventing means to allow full access to functions of said computer.

20. A method for operating a Telephony over LAN (ToL) system, comprising:

providing a graphical user interface (GUI) in a computer;

providing a ToL client window within said GUI;

manually placing said ToL client window into a guest mode; and locking a guest user into said ToL client window by preventing unauthorized use of functions of said computer external to said ToL client window in said guest mode, while allowing full access to features within said ToL client window, said functions comprising one or more other graphical user interface windows or program icons.

21. A Telephony over LAN (ToL) system, comprising:

means for providing a graphical user interface (GUI) in a computer;

means for providing a ToL client window within said GUI;

means for manually placing said ToL client window into a guest mode; and means for locking a guest user into said ToL client window by preventing unauthorized use of functions of said computer external to said ToL client window in said guest mode, while allowing full access to features within said ToL client window, said functions comprising one or more other graphical user interface windows or program icons.

22. A ToL client terminal according to claim 13, said functions comprising one or more other graphical user interface windows or program icons.

* * * * *